(12) United States Patent
Goodno et al.

(10) Patent No.: US 9,362,714 B1
(45) Date of Patent: Jun. 7, 2016

(54) ARCHITECTURE FOR ALL-FIBER DELIVERY OF COHERENTLY COMBINED LASER POWER

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US); Henry H. Shields, Huntington Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/656,367

(22) Filed: Mar. 12, 2015

(51) Int. Cl.
*H01S 3/00* (2006.01)
*H01S 3/13* (2006.01)
*H01S 3/067* (2006.01)
*G02F 1/01* (2006.01)
*G02F 1/365* (2006.01)
(Continued)

(52) U.S. Cl.
CPC ............ *H01S 3/1307* (2013.01); *G02B 6/2852* (2013.01); *G02F 1/0121* (2013.01); *G02F 1/0136* (2013.01); *G02F 1/365* (2013.01); *H01S 3/06758* (2013.01); *H01S 3/06783* (2013.01); *H01S 3/094057* (2013.01); *H01S 3/1301* (2013.01); *H01S 3/1308* (2013.01)

(58) Field of Classification Search
CPC .............. H01S 3/1307; H01S 3/06758; H01S 3/094057; H01S 3/1308; H01S 3/06783; H01S 3/1301; G02F 1/365; G02F 1/0136; G02F 1/0121; G02B 6/2852

USPC ...................... 359/237, 279, 333, 341.1, 349; 356/364; 250/225, 559.09
See application file for complete search history.

(56) References Cited

U.S. PATENT DOCUMENTS

| 6,275,632 B1 * | 8/2001 | Waarts ............... G02B 6/29319 372/43.01 |
| 7,333,736 B2 | 2/2008 | Sardesai et al. |
| 7,535,631 B2 | 5/2009 | Brown et al. |

(Continued)

OTHER PUBLICATIONS

Vazquez-Zuniga, L. A. et al. "Adaptive Broadband Continuum Source at 1200-1400 nm Based on an All-Fiber Dual-Wavelength Master-Oscillator Power Amplifier and a High-Birefringence Fiber" Optics Express, vol. 21, No. 6, Mar. 25, 2013, pp. 7712-7725.
(Continued)

*Primary Examiner* — Tuyen Tra
(74) *Attorney, Agent, or Firm* — John A. Miller; Miller IP Group, PLC

(57) ABSTRACT

A fiber amplifier system including a plurality of fiber amplifiers each receiving a fiber beam and a tapered fiber bundle (TFB) combiner including a plurality of input end fibers, a plurality of output end fibers and a center bundle portion, where each input end fiber is coupled to a separate one of the fiber amplifiers, and where the bundle portion combines all of the fiber beams into a single combined beam and each output end fiber being capable of receiving the combined beam separately from the other output end fibers. The system also includes a low non-linear delivery fiber coupled to an output end fiber of the TFB combiner and an optical output turret coupled to the delivery fiber opposite to the TFB combiner, wherein the non-linear delivery fiber is configured to reduce the effect of cross-phase modulation (XPM) instability in the delivery fiber.

26 Claims, 3 Drawing Sheets

(51) Int. Cl.
*G02B 6/28* (2006.01)
*H01S 3/094* (2006.01)

(56) References Cited

U.S. PATENT DOCUMENTS

| | | |
|---|---|---|
| 7,848,370 B2 | 12/2010 | Kewitsch et al. |
| 8,184,363 B2 | 5/2012 | Rothenberg |
| 8,488,235 B2 | 7/2013 | Rothenberg |
| 8,531,761 B2 | 9/2013 | Chann et al. |
| 8,705,166 B1 | 4/2014 | Savage-Leuchs |
| 8,731,008 B2 | 5/2014 | Clowes et al. |
| 8,744,224 B2 | 6/2014 | Wysocki |
| 8,768,118 B2 | 7/2014 | Sacks et al. |
| 8,786,942 B2 | 7/2014 | Palese et al. |
| 8,792,526 B2 | 7/2014 | Goodno |
| 8,837,033 B2 | 9/2014 | Goodno et al. |
| 8,922,771 B2 | 12/2014 | Goodno et al. |
| 8,922,772 B2 | 12/2014 | Goodno et al. |
| 2005/0207455 A1 | 9/2005 | MacCormack et al. |
| 2011/0280581 A1 | 11/2011 | Chann et al. |
| 2013/0107257 A1 | 5/2013 | Goodno et al. |
| 2013/0301663 A1 | 11/2013 | Clowes et al. |

OTHER PUBLICATIONS

Vorontsov, Mikhail A. et al. "Adaptive Wavefront Control with Asynchronous Stochastic Parallel Gradient Descent Clusters" Optical Society of America, vol. 23, No. 10, Oct. 2006, pp. 2613-2622.

Chen, Kang Kang, "High Power Pulsed Ytterbium Doped Fibre Lasers and Their Applications" Thesis submitted for the degree of Doctor of Philosophy, Jan. 2011, pp. 1-134.

\* cited by examiner

ARCHITECTURE FOR ALL-FIBER DELIVERY OF COHERENTLY COMBINED LASER POWER

BACKGROUND

1. Field

This invention relates generally to an all-fiber laser amplifier that provides high power and, more particularly, to a fiber laser amplifier including an all-fiber architecture that allows delivery of coherently combined laser power through an all-fiber beam combiner at the multi-kW level without polarization instability occurring as a result of non-linear cross-phase modulation (XPM).

2. Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam to amplify the seed beam and generate the laser beam, where the fiber typically has an active core diameter of about 10-20 µm.

Improvements in fiber laser amplifier designs have increased the output power of the fiber to approach its practical power and beam quality limit. To further increase the output power of a fiber amplifier some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

In one known multiple fiber amplifier design, a master oscillator (MO) generates a seed beam that is split into a plurality of fiber seed beams each having a common wavelength, where each fiber beam is amplified. The amplified fiber seed beams are then collimated and directed to a diffractive optical element (DOE) that combines the coherent fiber beams into a single output beam. The DOE has a periodic structure formed into the element so that when the individual fiber beams each having a slightly different angular direction are redirected by the periodic structure all of the beams diffract from the DOE in the same direction. Each fiber beam is provided to a phase modulator that controls the phase of the beam so that the phase of all the fiber beams is maintained coherent.

One known method for generating high power, near diffraction-limited beams for directed energy lasers is to utilize spectral or coherent beam combining of multiple narrow-line width fiber amplifiers. Typically, the size, weight and misalignment sensitivity of the beam combining optics scale directly with the number of fibers. Hence, maximizing power per fiber enables scaling to higher system powers in smaller and more robust packages. However, it is difficult to scale individual fiber laser amplifier powers above a few kilowatts because of numerous physical and engineering limitations, among them including stimulated Brillouion scattering (SBS), self phase modulation (SPM), spatial mode instabilities, thermal limits on pump power handling and diode pump brightness.

U.S. Pat. No. 8,488,235 issued Jul. 16, 2013 to Rothenberg, assigned to the assignee of this application and herein incorporated by reference, discloses a method for scaling per-fiber power by coherently combining the outputs of several fiber amplifiers into a single delivery fiber, which can then be fed to free-space optical beam combiners based on either SBC or CBC. In this approach, a tapered fiber bundle (TFB) fiber splitter is employed in reverse as a fiber combiner, where each input fiber to the TFB combiner is spliced to the output of a fiber amplifier. If the amplifier outputs are mutually coherent and properly phase-locked and polarization-locked using servo-control techniques, then near-100% of the input light can be combined into any one of the optic delivery fibers from the TFB combiner. The TFB combiner beam output can be directed through coherent switching to any of the output delivery fibers by changing the piston phases between the inputs. Multiple TFB combiners can be arranged to enable a single laser system to feed multiple SBC or CBC beam turrets.

A problem has been recognized with the architecture disclosed in the '235 patent that includes non-linear interactions between beams in the output delivery fiber downstream of the TFB combiner. Cross-phase modulation (XPM) between the input beams having different polarizations once the beams are co-propagating in the output delivery fiber leads to non-linear birefringence, which is a well known effect that is the basis for the Kerr shutter. In other words, as the combined beams co-propagate along the delivery fiber from the TFB combiner, they interact with each other through accumulated non-linear phase interaction causing polarization cross-talk between the beams even though they are in phase at the output of the TFB combiner. For example, the current synchronous polarization control approach employed to make the separate fiber beams co-polarized includes applying a polarization dither to each of the fiber beams prior to the TFB combiner, where that polarization dither is detected in the combined beam after the TFB combiner, and where the detected polarization is then used to adjust the polarization of the fiber beams so all the fiber beams are co-polarized. The polarization controller operates to slightly rotate or dither the state of polarization (SOP) of the particular beam back and forth so that when the beams are co-polarized, the corresponding output power will be maximized, where the power can be detected. However, at high optical irradiance levels, the polarization dither applied to one of the fiber beams prior to the TFB combiner interacts via XPM with the other beams in the delivery fiber from the TFB combiner, which causes the polarization of those beams to change. Thus, depending on the length of the delivery fiber and the optical irradiance, the XPM modulation causes increased cross-talk between the fiber beams affecting the polarization dither, which ultimately results in the inability to obtain an accurate detection of the polarization dither on a particular beam so that its polarization can be properly adjusted. This limits the ability of the fiber beams to be co-polarized at the input of the TFB combiner, which ultimately causes a significant portion of the light to be coupled into the delivery fibers from the TFB combiner that are not being used. With a typical delivery fiber mode field diameter of about 20 µm and meter class lengths, this effect becomes significant at about 1 kW power levels.

To further understand the XPM non-linearity discussed above, consider that the XPM generates a phase shift that is larger when beams are co-polarized than when they are perpendicularly polarized. Hence, each beam can induce a birefringent phase shift on the other co-propagating beams. Rotating the state of polarization (SOP) of one beam rotates the principle axes of the index ellipsoid and thus varies the birefringence, which can rotate the polarizations of the other co-propagating beams. One of the beams acts as a pump to effectively create a wave plate in the delivery fiber that can rotate the polarizations of the other co-propagating probe beams. If all of the beams are of a near-equal power, as would be generally expected in a CBC architecture, then each beam acts as a pump for all other beams. This cross-couples the SOPs and interferes with the polarization control, resulting in instability and a decreased coherent combination efficiency.

U.S. Pat. Nos. 8,922,771 and 8,922,772 issued to Goodno et al., assigned to the assignee of this application and herein incorporated by reference, disclose a multichannel optical polarization controller including a mixing device responsive to a sample beam and a reference beam that provides an in-phase signal including the mixed sample beam and reference beam with a 0° relative phase shift, and an in-quadrature signal including the mixed sample beam and reference beam with a 90° relative phase shift.

The '771 and '772 patents use phase dithers on each beam to identify a given beam at the combined output, and then provides feedback to correct the beam's polarization. In this implementation, the input polarization is dithered simultaneously on all input beams, but this causes concomitant changes in the SOP of the other beams through XPM coupling. Hence, at high power levels where non-linear effects in the delivery fiber are significant, the polarization dither information in the de-multiplexed signals is obscured by XPM-driven cross-talk from the polarization dithers of the other channels, rendering the control loop unstable. Using this polarization control technique, the XPM mechanism prevents effective beam combining and beam switching beyond 1 kW with meter-class lengths of 20 um core diameter delivery fiber after the combiner, thus constraining the output of all-fiber beam combiners in high power beam combined laser systems. Thus, there is a need for a fiber laser amplifier that delivers multi-channel coherent power using TFB combiners that does not suffer from XPM instability.

DETAILED DESCRIPTION OF THE EMBODIMENTS

The following discussion of the embodiments of the invention directed to a fiber laser amplifier employing various techniques for reducing non-linear cross-phase modulation instability between input beams of different polarizations is merely exemplary in nature, and is in no way intended to limit the invention or its applications or uses.

Figure 1:
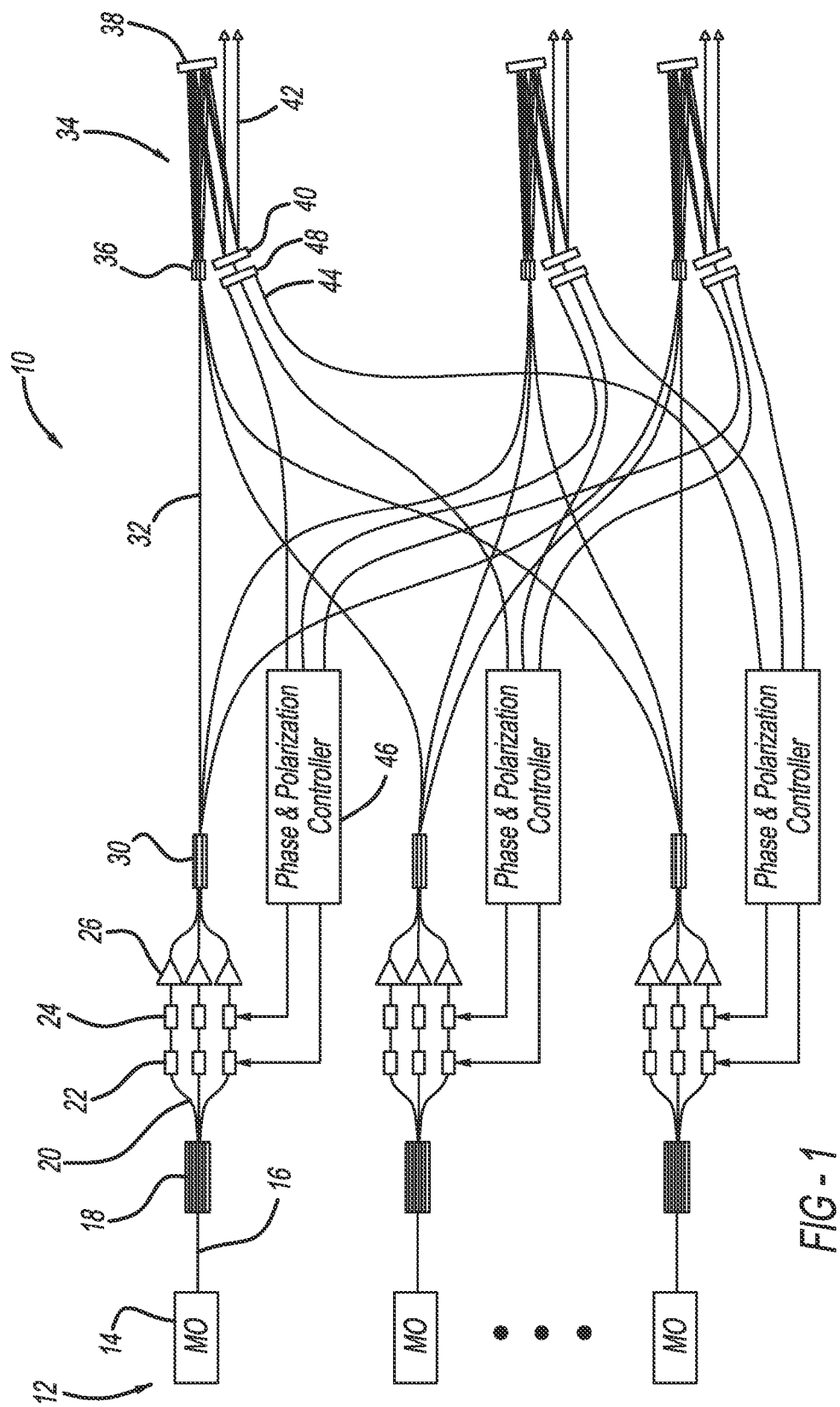
FIG. 1 is a schematic diagram of a known fiber laser amplifier including a tapered fiber bundle and employing SBC.

FIG. 1 is a schematic diagram of a known fiber laser amplifier system 10 that employs SBC of the type disclosed in the '235 patent referenced above. The system 10 includes a number of wavelength channels 12 each including a master oscillator (MO) 14 that generates a signal beam on a fiber 16 at a particular wavelength $\lambda$, where each MO 14 generates a different wavelength, a beam splitter 18 that splits the signal beam into a number of fiber beams provided on fibers 20, a phase modulator 22 for controlling the phase of each of the fiber beams so that all of the fiber beams are coherent, and a polarization modulator 24 that controls the polarization of each of the fiber beams so all of the beams are co-polarized. Each of the fiber beams are sent to a fiber amplifier 26, where the amplifier 26 will typically be a doped amplifying portion of the fiber 20 that receives an optical pump beam (not shown).

All of the coherent and co-polarized amplified fiber beams are then provided to a TFB combiner 30 that combines the fibers 20 into a combined fiber mass, where all the fiber beams are coherently combined into a single combined beam in a manner well understood by those skilled in the art. It is noted that although the discussion herein is specific to a TFB combiner, other types of fiber-coupled combiners that include fiber inputs, a central mixing section where the fiber beams are combined, and output fibers could also be applicable. The mixing section could include free space optics, such as a beam splitter with fiber—coupled inputs and outputs, or any suitable evanescent waveguide coupler. Each output fiber of each of the TFB combiners 30 is coupled to a delivery fiber 32, where a separate one of each of the delivery fibers 32 from each of the TFB combiners 30 in each optical input channel 12 is sent to a separate optical output turret 34. In this non-limiting embodiment merely for discussion purposes, each of the optical input channels is split into three fiber beams so that there are three delivery fibers 32 for each TFB combiner 30. As discussed in the '235 application, the phase of the combined beam in the TFB combiner 30 can be controlled so that most of the beam power is directed to any one of delivery fibers 32 so that all of the combined beams at the different wavelengths in the channels 12 can be sent to the same output turret 34 to be spectrally combined.

An output delivery fiber 32 from each of the TFB combiners 30 is coupled to collimating optics 36 in the particular output turret 34 that directs the beams from the delivery fibers 32 to a spectral beam combining (SBC) grating 38 that spatially combines the beams having the different wavelengths and redirects the combined beams to a beam sampler 40. Most of the spectrally combined beam is reflected from the beam sampler 40 as an output beam 42 from the system 10. However, a portion of the beam from the SBC grating 38 propagates through the beam sampler 40 and is wavelength-filtered by a wavelength selective element 48. The wavelength filtered beam samples are coupled into a set of sample fibers 44 and are then provided to a multichannel phase and polarization controller 46 in each wavelength channel 12. Each of the phase and polarization controllers 46 includes suitable mixing optics, photodetectors for converting optical signals to electrical signals, and control algorithms, such as those disclosed in the '771 and '772 patents. Also, although each controller 46 is shown and described as a phase and polarization controller, the controllers 46 can actually be separate controllers, where one controller provides phase control and one controller provides polarization control. Each of the controllers 46 will select only one of the sample beams from the sample fibers 44 from one of the output turrets 34 for feedback control, thus determining the output beam 42 that carries the high power laser energy. In a conventional polarization controller, it is necessary to detect the individual polarized powers of the separate beams in the combined beam to provide polarization control separately in the fibers 20. As discussed above, and in more detail in the '771 and '772 patents, these known techniques employ coherent de-multiplexing to separate the separate coherent signals to identity three separate polarized power measurements of the individual beams in the combined beam. Each of the separately identified polarized power measurements are used to generate control signals that are then independently provided to the particular polarization modulator 24 by the phase and polarization controller 46.

Figure 2:
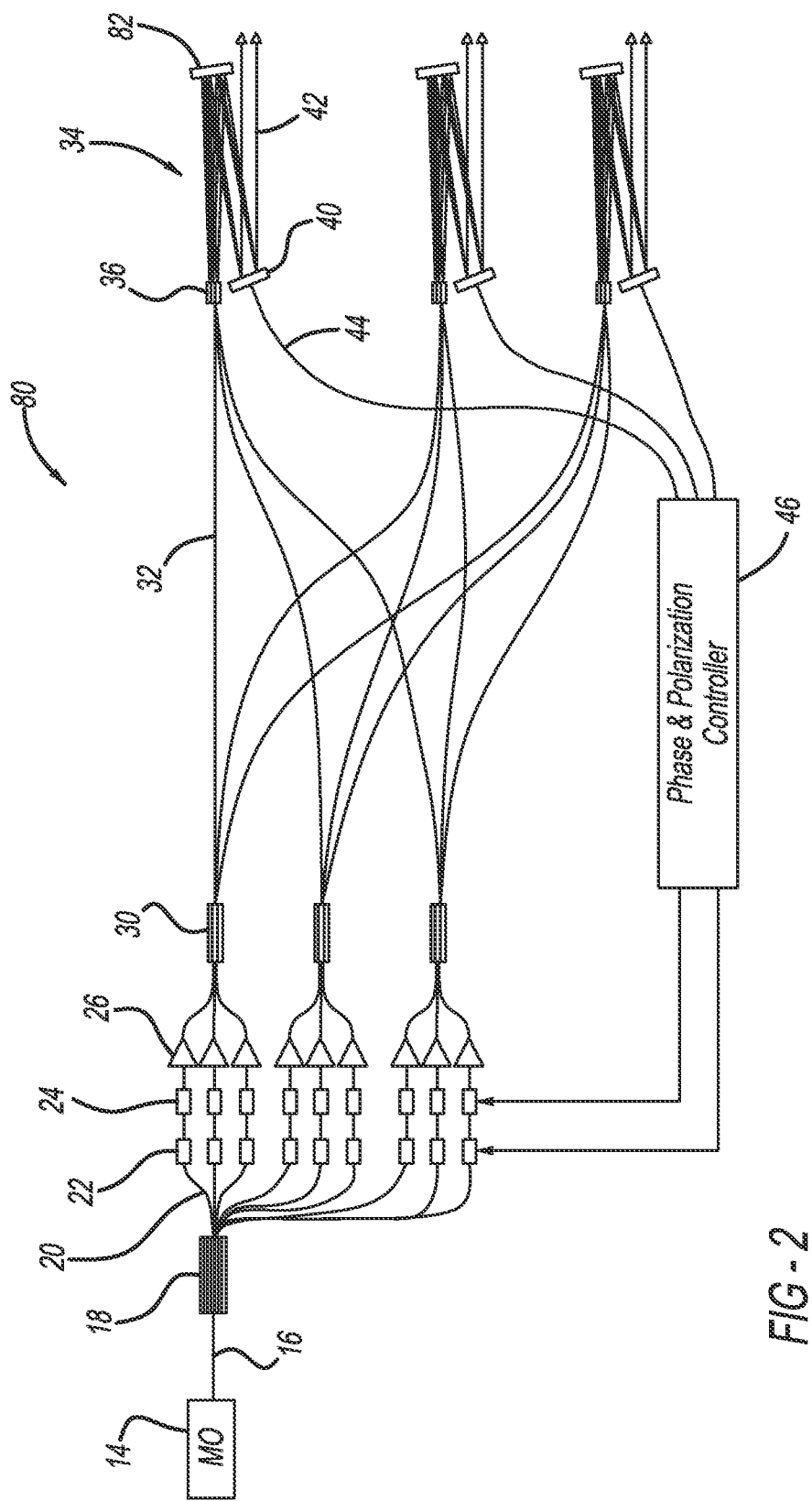
FIG. 2 is a schematic diagram of a known fiber laser amplifier including a tapered fiber bundle and employing CBC.

The fiber laser amplifier system 10 employs the output turrets 34 based on the SBC beam combiners 38 for multiple wavelength signals as discussed. In an alternate embodiment, FIG. 2 is a schematic diagram of a known fiber laser amplifier system 80 that employs output turrets based on CBC beam combiners well know to those skilled in the art, where like elements to the amplifier system 10 have the same reference number. In the system 80, only a single MO 14 is employed so that all of the beams have the same wavelength. Further, the output turrets 34 include a CBC element 82 that coherently combines the beams from the separate delivery fibers 32 in a manner well understood by those skilled in the art. The CBC element 82 can be, for example, a diffractive optical element (DOE) beam combiner. Since there is only one optical channel and a single wavelength, only a single phase and polarization controller 46 is necessary.

As discussed above, depending on the length of the delivery fibers 32 and the individual channel powers, XPM modulation causes non-linear interference and instability between the individual beams propagating therein from the TFB combiner 30, which reduces the ability of the phase and polarization controllers 46 to accurately detect the separate dither frequency for polarization correction in the separate beams.

Figure 3:
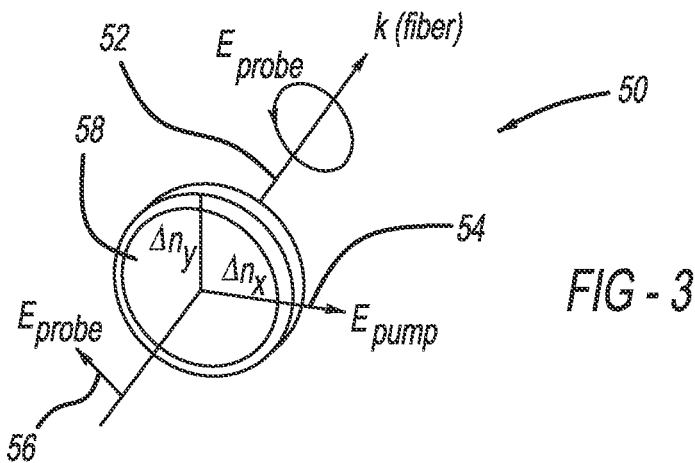
FIG. 3 is a conceptual illustration of non-linear cross-phase modulation in a delivery fiber after a tapered fiber bundle.

FIG. 3 is a conceptual illustration 50 depicting XPM between co-propagating beams. In the illustration 50, line 52 represents propagation of two separate combined beams, such as in the delivery fiber 32, where one of the beams is described as a probe beam and one of the beams is described as a pump beam, and where the pump beam is shown to have a horizontal polarization represented by line 54. This horizontal polarization of the pump beam causes birefringence $\Delta n_x - \Delta n_y$ in the delivery fiber 32, where $\Delta n_x$ is the induced change in the index of refraction for light polarized horizontally the same as the pump beam, and $\Delta n_y$ is the induced change in the index of refraction for light polarized vertically, orthogonal to the pump beam. The probe beam has a polarization different than the polarization of the pump beam represented by line 56, which can in general be written as a linear super-position of two fields polarized parallel and perpendicular to the pump field. Therefore, based on the pump-induced birefringence $\Delta n_x - \Delta n_y$, the portion of the probe beam having a horizontal polarization the same as the pump beam experiences a birefringent phase delay relative to the component of the probe beam having a polarization perpendicular to the polarization of the pump beam. Thus, the birefringent change in index of refraction $\Delta n_x - \Delta n_y$ in the delivery fiber operates as a wave plate 58 that causes a rotation in the polarization of the probe beam. The polarization of the probe beam will have the same effect on the pump beam, especially if they have similar optical powers.

As will be discussed in detail below, the present invention proposes a fiber amplifier system including an all-fiber architecture that enables delivery of coherently combined laser power through all-fiber beam combiners at the multi-kW power level, without polarization instability arising from non-linear XPM. As will be discussed, several embodiments are disclosed to avoid XPM instability, including the use of short lengths of delivery fiber, the use of a polarization maintaining delivery fiber, special polarization control methods that are robust in the presence of XPM instability, and feedback sampling geometries that bypass XPM entirely. The disclosed optical systems enable the use of all-fiber couplers in spectrally or coherently beam combined laser architectures, both as beam switches to feed multiple laser turrets and as power multipliers to boost the raw per-fiber powers.

Figure 4:
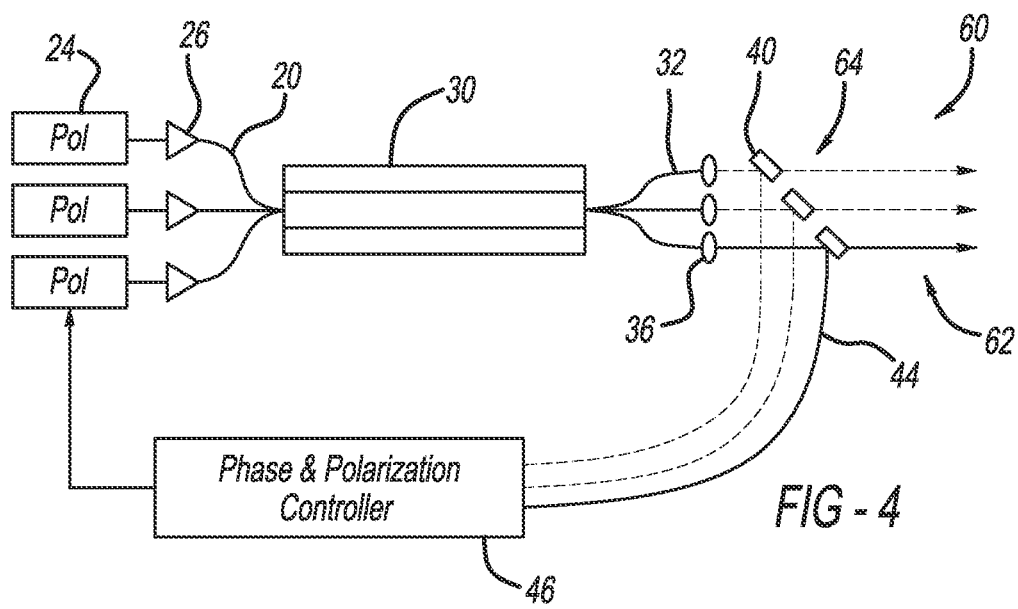
FIG. 4 is a schematic diagram of a fiber laser amplifier including a tapered fiber bundle having output delivery fibers.

FIG. 4 is a schematic diagram of a fiber laser system 60 that can be used to illustrate several of these embodiments for both SBC and CBC, where like elements to the systems 10 and 80 are identified by the same reference number. As discussed above, the phase of the fiber beams in the fibers 20 are controlled so that most of the power is directed into a particular one of the delivery fibers 32 at the output of the TFB combiner 30. To better illustrate this, one of the output turrets 34 is shown as a main output turret 62 having solid lines to show which of the turrets 34 all of the power from the TFB combiner 30 is directed and the other output turrets 34 are depicted as null turrets 64 by dotted lines showing those channels that do not receive any of the output power from the TFB combiner 30.

Since the XPM instability is due to an accumulated non-linear phase in the delivery fiber 32, it can be reduced to negligible levels by using low non-linearity delivery fibers after the TFB combiner 30. Non-linear strength is parameterized by the known B-integral as:

$$B = \frac{2\pi n_2}{\lambda} \frac{P \cdot L}{A_{eff}}, \qquad (1)$$

where $n_2$ is the non-linear index of refraction of the delivery fiber 32, $\lambda$ is the optical wavelength, P is the combined power after the TFB combiner 30, L is the length of the delivery fiber 32, and $A_{eff}$ is the effective mode field area in the delivery fiber 32. XPM instability prevents the effective use of standard polarization control methods when B>~1 radian. Using typical values for silica step index fibers with a 20 um core diameter, such as $n_2$=2.5e-20 m$^2$/W;

$$\lambda = 1.06 \ \mu m;$$

$A_{eff}$=260 μm$^2$, this constrains P·L<1.7 kW·m.

From the above analysis, three non-linear delivery fiber embodiments can be proposed to reduce the delivery fiber XPM non-linearity and thus enable scaling of the power P to higher values. First, short delivery fiber lengths can be employed to constrain the length L of the delivery fiber 32 to keep B<1 radian, where:

$$L < \frac{\lambda A_{eff}}{2\pi n_2 P}. \qquad (2)$$

For the exemplary numbers above, this would constrain the length L<60 cm of the delivery fiber 32 for 3 kW output powers. This is a sufficient length to enable termination and mechanical mounting of the fiber tip using standard manufacturing methods and components, and hence may be useful for some fiber amplifier systems that do not require long distances between the TFB combiner 30 and subsequent free space optical systems, such as the output turrets 34.

The second low non-linearity delivery fiber embodiment includes increasing the fiber mode field area $A_{eff}$ of the delivery fiber 32 to maintain B<1 radian, but for longer fibers where:

$$A_{\it eff} > \frac{2\pi n_2}{\lambda} P \cdot L. \quad (3)$$

As is well understood by those skilled in the art, the effective mode field area $A_{\it eff}$ in a fiber is the cross-sectional area of the propagation modes of the fiber in the core and other layers of the fiber. A larger effective mode field area $A_{\it eff}$ allows the light to spread across a wider cross-section so that the intensity of the light is reduced, which has the effect of reducing the XPM instability per unit length of the delivery fiber 32. Different techniques are being investigated in the art for increasing the effective mode field area $A_{\it eff}$ of a particular diameter fiber, including different fabrication techniques, different fiber structures, different fiber materials, etc. Thus, if the XPM instability is reduced in the delivery fiber 32 by increasing the effective mode field area $A_{\it eff}$, then the length of the fiber 32 can be increased before the XPM instability has a significant enough effect on the output polarization of the particular beam.

The above described polarization control approach will enable scaling of both the combined power and the length of the delivery fiber 32, and thus provides additional utility beyond the short-fiber approach discussed above. For example, with 3 kW output power, increasing the mode field area $A_{\it eff}$ of the delivery fiber 32 to about 3000 µm² would enable L>6 m. This is a sufficient length to provide utility of the TFB combiner 30 as a switch to feed beam combiners/beam directors with a turret spacing greater than 10 m, which is compatible with the operation on typical mobile air, sea and ground platforms. While conventional step index fibers cannot easily scale to large mode field areas, a number of other prior art fiber designs could be used to increase mode field area beyond the limits of step index fibers, including adiabatically tapered delivery fibers, high-order mode fibers, leakage channel fibers, chirally coupled core fibers, photonic crystal fibers, etc.

The third low non-linearity delivery fiber embodiment includes employing a lower non-linear index of refraction $n_2$ in the delivery fiber 32. Since the length L of the delivery fiber 32 is limited by the non-linear index of refraction $n_2$, a reduction in the non-linear index of refraction $n_2$ will allow a longer delivery fiber before the XPM effect degrades performance, where:

$$n_2 < \frac{\lambda A_{\it eff}}{2\pi P L}. \quad (4)$$

The effective value of the non-linear index of refraction $n_2$ can be reduced by using fibers with different core materials other than $SiO_2$. For example, hollow core delivery fibers can be used that have about a 50 times lower effective non-linear index of refraction $n_2$ since the mode propagates primarily in air. Assuming other parameters are the same as for step-index fibers, the use of hollow core fibers would enable the length L>30 m of the delivery fiber 32 for 3 kW output powers.

The preceding discussed embodiments enable stable polarization control at high powers by reducing the strength of the delivery fiber XPM non-linearity. An alternate embodiment is to enable stable polarization control despite the presence of strong XPM by modifying the phase and polarization controller 46. Multichannel stochastic parallel gradient descent (SPGD) polarization control of an optical beam is a well known empirical hill-climbing algorithm that is model-independent, and does not require knowledge of individual polarization states to maximize the combined power. The conventional technique for providing the polarization control of the fiber beams discussed above with reference to FIG. 4 is not used in this embodiment because it is ineffective for beams that are subject to significant XPM instability. In this embodiment, the phase and polarization controller 46 is not the typical polarization controller, but is a polarization controller that employs a hill-climbing algorithm providing multichannel stochastic parallel gradient descent as described herein. In this polarization technique, all of the beams in the fibers 20 are polarization dithered simultaneously in an attempt to maximize the combined output power from the combined beams without attempting to de-multiplex the separate powers in the combined beam. Therefore, the total power is optimized in the SPGD polarization control technique.

Although multichannel SPGD polarization control has been disclosed in the art, its application for mitigation of XPM instability between copropagating signals in delivery fibers has not been identified. In the SPGD technique, all of the beams are dithered simultaneously, but the feedback is provided simply on the basis of maximizing the combined polarization power. This differs significantly from known current control techniques that explicitly de-multiplex each beam's polarized power for feedback to each individual polarizer modulator 24. The simplicity of a hill-climbing approach would appear to avoid the issue of interference from non-linear cross-coupling of polarizations between fiber beams. Although XPM instability will still be present, the hill-climbing control method simply maximizes the common output polarization, without requiring explicit knowledge of the individual beams SOPs.

According to another embodiment, XPM instability in the delivery fiber 32 is reduced through null-channel polarization control. The conventional approach is to sample the combined beam at the output of the delivery fiber 32, and apply feedback to maximize beam power in the main output turret 62. Alternatively, the combined beam can be sampled in the nulled turrets 64, i.e., all the output channels that will be switched off when a desired output channel is maximized. By applying polarization feedback to minimize the total power in the nulled turrets 64, the power will naturally be maximized in the main output turret 62. This approach does not suffer from XPM instability since the combined power times length product PL in the nulled turrets 64 will be near-zero due to the low power that is present. All of the undesired turrets will be nulled simultaneously. XPM instability will still be present in the desired main output turret 62, but it will not prevent stable coherent power combining and polarization locking at the delivery fiber input using this technique. In this embodiment, the output power of all of the nulled output turrets 64 would need to be detected to ensure that none of those channels is receiving significant optical power, but it would not be necessary to use multiple detectors to detect the output power in each of the nulled output turrets 64.

According to another embodiment, local tap polarization sampling is employed to reduce the effects of XPM instability. In this embodiment, a local tap coupler is used to sample a small fraction of the combined power in the main output beam. The tap coupler is located very close to the output of the TFB combiner 30 so that the accumulated non-linearity of the co-propagating combined signals is less than one radian. The tap could potentially be integrated into the TFB combiner structure. By sampling light at the input end of the delivery fiber 32, any standard multi-channel polarization controller can be used to lock the polarizations of the fiber beams. XPM instability will still be present in the desired main output turret 62, but it will not prevent stable polarization locking using this technique.

Figure 5:
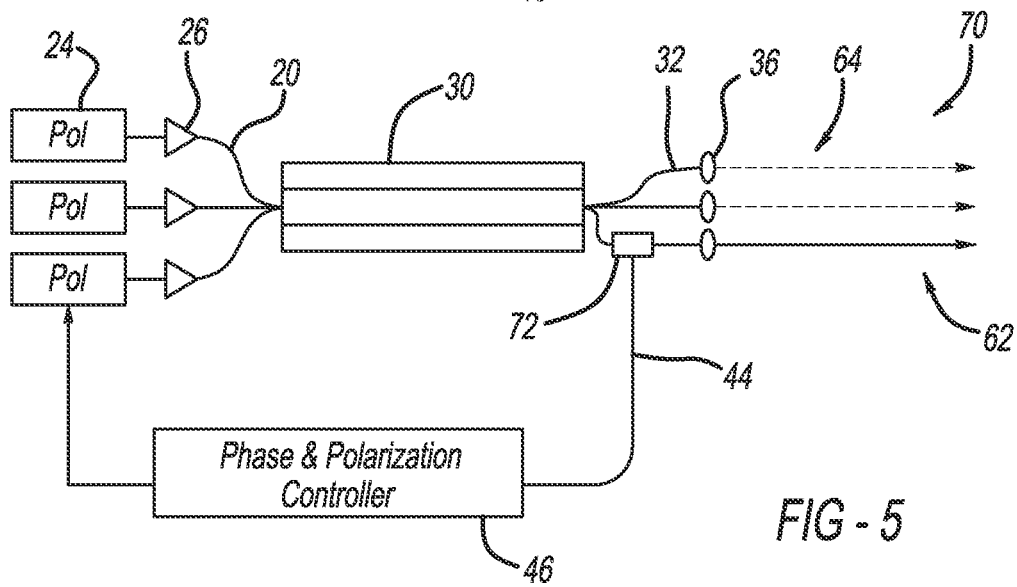
FIG. 5 is a schematic diagram of a fiber laser amplifier including a tapered fiber bundle having output delivery fibers and a local tap polarization controller.

FIG. 5 is a schematic diagram of a fiber laser amplifier system 70 that is similar to the amplifier 60, where like elements are identified by the same reference number, illustrating the local tap polarization control embodiment. In the system 70, a tap coupler 72 is provided at an input end of the delivery fiber 32 for the main output turret 62. The tap coupler 72 splits a small fraction of the combined beam into the sample fiber 44. Thus, the combined beam in the delivery fiber 32 will be sampled prior to a location of the delivery fiber 32 where XPM instability has accumulated. It is noted that the beam samplers 40 are not shown in the system 70 because they are not required to sample the beam for phase and polarization control purposes.

Use of a polarization maintaining (PM) fiber that is a highly birefringent delivery fiber is another potential solution to XPM polarization instability. As is well understood by those skilled in the art, a polarization maintaining fiber is a fiber having different indices of refraction in orthogonal directions, referred to as the principal axes, so that polarization along one principal axis perpendicular to the propagation direction is higher than polarization along the orthogonal principal axis. Thus, light propagating along a PM fiber that is polarized in the direction of a principal axis will be maintained in that polarization along the propagation length of the fiber and is not significantly affected by XPM instability. In a PM fiber, the fiber structure is designed so that there is a natural birefringence on the order of $10^{-4}$ usually by imposing an anisotropic stress across the core of the fiber during the fiber draw, such as using stress rods made of a different coefficient of thermal expansion material that breaks the azimuthal symmetry of the fiber. This large level of fiber birefringence would be expected to overwhelm the XPM-induced birefringence $\Delta n_x - \Delta n_y$, which is about a thousand times smaller ($10^{-7}$). Hence, even in the presence of strong XPM instability, the polarizations of the beams would stay aligned with the principal axis of the PM fiber. Standard polarization controllers sampling the output of PM delivery fiber would ensure the beams are co-polarized at the PM fiber input.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fiber amplifier system comprising:
a master oscillator generating a signal beam;
at least one beam splitter splitting the signal beam into a plurality of fiber beams;
a plurality of polarization modulators each receiving one of the fiber beams, each polarization modulator providing polarization control of the fiber beam;
a plurality of phase modulators each receiving one of the fiber beams, each phase modulator providing phase control of the fiber beam;
a plurality of fiber amplifiers each receiving a polarization and phase controlled fiber beam, each fiber amplifier amplifying a fiber beam, said fiber amplifiers each including an output end;
a fiber-coupled combiner including a plurality of input end fibers, a plurality of output end fibers and a center mixing portion, each input end fiber being coupled to a separate one of the output end of the fiber amplifiers, said mixing portion combining all of the fiber beams received by the input end fibers into a single combined beam and each output end fiber being capable of receiving the combined beam separately from the other output end fibers;
a separate delivery fiber coupled to each output end fiber of the fiber-coupled combiner;
a plurality of optical output turrets each being coupled to a separate one of the delivery fibers opposite to the fiber-coupled combiner;
at least one phase controller receiving a phase signal from the optical output turrets and controlling the phase modulators, said phase controller providing phase control so as to direct the combined beam to a selected main one of the optical output turrets, where the other optical output turrets are nulled turrets that do not receive optical power from the fiber-coupled combiner; and
at least one polarization controller receiving a polarization signal from one or more of the optical output turrets and controlling the polarization modulators, wherein one or more of the delivery fibers or the polarization controller reduce the effect of cross-phase modulation (XPM) instability in the delivery fiber coupled to the main output turret.

2. The system according to claim 1 wherein the XPM instability is controlled by providing a non-linear delivery fiber.

3. The system according to claim 2 wherein the non-linear delivery fiber reduces the XPM instability by maintaining a B-integral to be less than 1 radian, where the B-integral is defined as:

$$B = \frac{2\pi n_2}{\lambda} \frac{P \cdot L}{A_{\text{eff}}},$$

where $n_2$ is a non-linear index of refraction of the delivery fiber, $\lambda$ is an optical wavelength of the combined beam, P is the combined power in the beam after the TFB combiner, L is the length of the delivery fiber, and $A_{\text{eff}}$ is the effective mode field area in the delivery fiber.

4. The system according to claim 3 wherein the delivery fiber maintains the B-integral to be less than one radian by reducing the length L of the delivery fiber as:

$$L < \frac{\lambda A_{\text{eff}}}{2\pi n_2 P}.$$

5. The system according to claim 3 wherein the delivery fiber maintains the B-integral to be less than one radian by increasing the effective fiber mode area $A_{\text{eff}}$ of the delivery fiber as:

$$A_{\text{eff}} > \frac{2\pi n_2}{\lambda} P \cdot L.$$

6. The system according to claim 5 wherein the effective fiber mode area $A_{\text{eff}}$ of the delivery fiber is increased by providing adiabatically tapered delivery fibers, high-order mode fibers, chirally-coupled core fibers, or photonic crystal fibers.

7. The system according to claim 3 wherein the delivery fiber maintains the B-integral to be less than one radian by reducing the non-linear index of refraction $n_2$ of the delivery fiber as:

$$n_2 < \frac{\lambda A_{\mathit{eff}}}{2\pi PL}.$$

8. The system according to claim 7 wherein the non-linear index of refraction of the delivery fiber is reduced by making a core of the delivery fiber hollow.

9. The system according to claim 1 wherein the polarization controller controls XPM instability by providing multichannel stochastic parallel gradient decent polarization control that includes observing the combined power of the combined beam and controlling each of the polarization modulators separately.

10. The system according to claim 1 wherein the polarization controller controls XPM instability by detecting the power in the nulled output turrets and controlling the polarization modulators so that the output power in the nulled turrets is at or near zero.

11. The system according to claim 1 further comprising a tap coupler provided at an input end of the delivery fiber in the main output turret proximate to the fiber-coupled combiner that taps off a small portion of the combined beam before XPM instability has had a chance to accumulate in the delivery fiber, where the tapped optical power is detected to generate a polarized power signal to send to the polarization controller to control the polarization modulators.

12. The system according to claim 1 wherein the delivery fiber controls the XPM instability by being a polarization maintaining fiber.

13. The system according to claim 1 wherein the fiber-coupled combiner is a tapered fiber bundle combiner.

14. A fiber amplifier system comprising:
a plurality of fiber amplifiers each receiving a fiber beam, each fiber amplifier amplifying a fiber beam, said fiber amplifiers each including an output end;
a fiber-coupled combiner including a plurality of input end fibers, a plurality of output end fibers and a center bundle portion, each input end fiber being coupled to a separate one of the output end of the fiber amplifiers, said bundle portion combining all of the fiber beams received by the input end fibers into a single combined beam and each output end fiber being capable of receiving the combined beam separately from the other output end fibers;
a non-linear delivery fiber coupled to an output end fiber of the fiber-coupled combiner; and
an optical output turret coupled to the delivery fiber opposite to the fiber-coupled combiner, wherein the non-linear delivery fiber is configured to reduce the effect of cross-phase modulation (XPM) instability in the delivery fiber.

15. The system according to claim 14 wherein the non-linear delivery fiber reduces the XPM instability by maintaining a B-integral to be less than 1 radian, where the B-integral is defined as:

$$B = \frac{2\pi n_2}{\lambda} \frac{P \cdot L}{A_{\mathit{eff}}},$$

where $n_2$ is a non-linear index of refraction of the delivery fiber, $\lambda$ is an optical wavelength of the combined beam, P is the combined power in the beam after the TFB combiner, L is the length of the delivery fiber, and $A_{\mathit{eff}}$ is the effective mode field area in the delivery fiber.

16. The system according to claim 15 wherein the delivery fiber maintains the B-integral to be less than one radian by reducing the length L of the delivery fiber as:

$$L < \frac{\lambda A_{\mathit{eff}}}{2\pi n_2 P}.$$

17. The system according to claim 15 wherein the delivery fiber maintains the B-integral to be less than one radian by increasing the effective fiber mode area $A_{\mathit{eff}}$ of the delivery fiber as:

$$A_{\mathit{eff}} > \frac{2\pi n_2}{\lambda} P \cdot L.$$

18. The system according to claim 17 wherein the effective fiber mode area $A_{\mathit{eff}}$ of the delivery fiber is increased by providing adiabatically tapered delivery fibers, high-order mode fibers, chirally-coupled core fibers, or photonic crystal fibers.

19. The system according to claim 15 wherein the delivery fiber maintains the B-integral to be less than one radian by reducing the non-linear index of refraction $n_2$ of the delivery fiber as:

$$n_2 < \frac{\lambda A_{\mathit{eff}}}{2\pi PL}.$$

20. The system according to claim 19 wherein the non-linear index of refraction of the delivery fiber is reduced by making a core of the delivery fiber hollow.

21. The system according to claim 14 wherein the delivery fiber controls the XPM instability by being a polarization maintaining fiber.

22. The system according to claim 14 wherein the fiber-coupled combiner is a tapered fiber bundle combiner.

23. A fiber amplifier system comprising:
a plurality of fiber amplifiers each receiving a fiber beam, each fiber amplifier amplifying a fiber beam, said fiber amplifiers each including an output end;
a fiber-coupled combiner including a plurality of input end fibers, a plurality of output end fibers and a center bundle portion, each input end fiber being coupled to a separate one of the output end of the fiber amplifiers, said bundle portion combining all of the fiber beams received by the input end fibers into a single combined beam and each output end fiber being capable of receiving the combined beam separately from the other output end fibers;
a non-linear delivery fiber coupled to an output end fiber of the fiber-coupled combiner; and
an optical output turret coupled to the delivery fiber opposite to the fiber-coupled combiner; and
a polarization controller receiving a polarization signal from the optical output turret and controlling polarization modulators to control the polarization of the fiber beams, wherein the polarization controller reduces the effect of cross-phase modulation (XPM) instability in the delivery fiber.

24. The system according to claim 23 wherein the polarization controller controls XPM instability by providing multichannel stochastic parallel gradient decent polarization control that includes observing the combined power of the combined beam and controlling each of the polarization modulators separately.

25. The system according to claim 23 wherein the polarization controller controls XPM instability by detecting the power in the nulled output turrets and controlling the polarization modulators so that the output power in the nulled turrets is at or near zero.

26. The system according to claim 23 wherein the fiber-coupled combiner is a tapered fiber bundle combiner.

* * * * *